Sept. 10, 1929.  W. E. HUMMEL  1,728,123
GLARE SHIELD FOR REAR VIEW MIRRORS
Filed Feb. 26, 1926
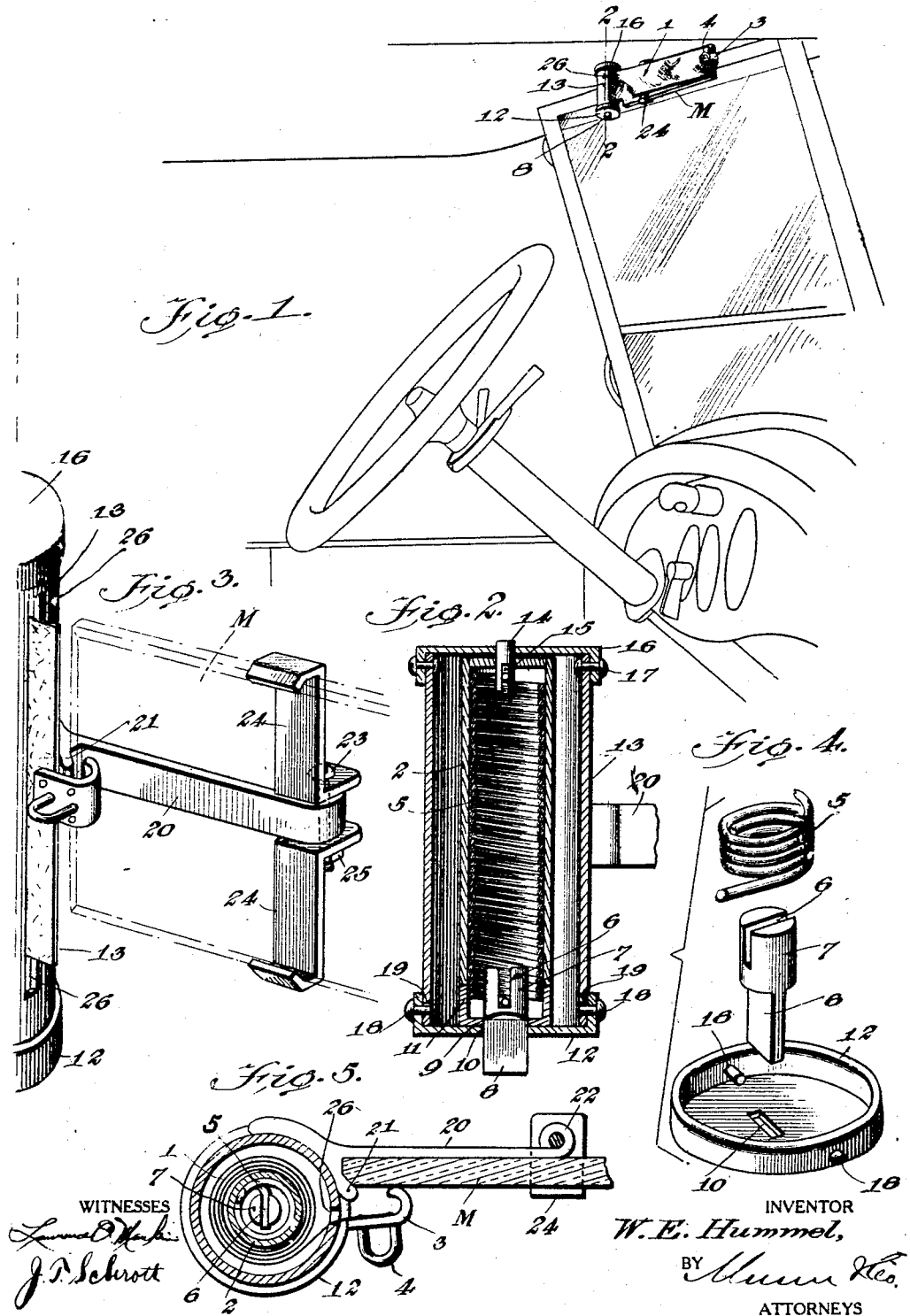
INVENTOR
W. E. Hummel,
BY
ATTORNEYS
WITNESSES Patented Sept. 10, 1929.

1,728,123

UNITED STATES PATENT OFFICE.

WILLIAM E. HUMMEL, OF SANTA BARBARA, CALIFORNIA.

GLARE SHIELD FOR REAR-VIEW MIRRORS.

Application filed February 26, 1926. Serial No. 90,878.

This invention relates to improvements in glare shields and it consists of the constructions, combinations and arrangements herein described and claimed.

An object of the invention is to provide an attachment for the rear view mirror of a motor vehicle which will permit a screen to be drawn across the face of the rear view mirror and secured so as to remain in the drawn position for the purpose of protecting the eyes of the driver from the glaring headlights of a following vehicle.

Other objects and advantages appear in the following specification, reference being had to the accompanying drawings, in which Figure 1 is a perspective view illustrating the invention in use, Figure 2 is a detail sectional view taken substantially on the line 2—2 of Figure 1, Figure 3 is a detail perspective view more particularly illustrating the means by which the spring roller casing is mounted upon the mirror.

Figure 4 is a detail perspective view of associated portions of the invention hereinafter referred to.

Figure 5 is a detail horizontal section.

The rear view mirror M is so mounted upon or above the windshield and near the top of the motor vehicle that the driver can see approaching vehicles by merely looking up into the mirror. The rear view mirror has become almost indispensable for the purpose described, but with the advantages there is the objectionable feature that it reflects the light from headlights of a vehicle approaching from the rear, blinding and confusing the driver so that he is persuaded to turn the mirror up out of the way and thereby dispense with the protection that it affords.

According to the invention it is proposed to provide means whereby a shade 1 can be drawn across the face of the mirror when the annoyance of headlight glare is felt. The shade 1 may consist of a light gauze, one end of which is wound upon a spring roller 2, the other end of which has a hook 3 and a handle 4 by which the shade is conveniently operated. The handle 4 is taken in the fingers of one hand and pulled across the face of the mirror until the hook 3 can be fitted over the edge as shown in Figure 1. The spring tension upon the shade 1 will hold the hook in place.

Spring tension upon the shade 1 is obtained by the connection of one end of a spring 5 with the roller 2, the opposite end of the spring being seated in the kerf 6 of a pin 7. The pin has a non-circular end 8 which passes through registering slots or openings 9 and 10 in the spring roller cover 11 and casing cover 12 respectively. The casing 13 contains the entire spring roller, the circular pin 14 to which the first end of the spring is attached by means of the engagement of the end of the spring with a slot 15, having bearing in the opposing casing cover 16.

The pin 14 is suitably fixed in the end of the roller 2. The roller contains a spring as shown, and the spring extends slightly beyond the joint between the roller and cover 11, thereby keeping the roller centered in respect to the cover and pin 7. The upper cover 16 may be permanently secured in place as at 17, but the lower cover 12 is held in place by a suitable split joint, for example, the familiar bayonet joint. To this end the flange of the cover 12 has opposing studs 18 which ride in appropriately shaped slots 19 near the lower edge of the casing 19.

The use of such a shade and mounting in connection with the rear view mirror is provided for as follows: An arm 20 forms part of the mounting means of the casing 13. This arm is suitably attached to the casing at one end, said end including a short flange 21 engaging the forward portion of the adjacent edge of the mirror M about as shown in Figure 5. At the opposite end the arm 20 is curled upon itself at 22 to receive the bolt 23. This bolt passes through the flanges of a pair of clamping members 24. The opposite extremities of these are bent to fit over the longitudinal edges of the mirror as shown in Figure 3. The clamp is firmly affixed to the mirror by tightening the nut 25 on the bolt.

The operation is readily understood. The attachment is applied to the mirror M adjacent to one of the short edges (preferably the left edge) by fitting the flange 21 of the arm 20 over the forward part of that edge, and applying the clamping members 24 to the upper and lower longitudinal edges as shown. The arm 20 as well as the greater portion of the clamping means, takes a position in the back of the mirror so that the attachment does not render the appearance unsightly. The casing 13 stands in the upright position at the extreme left of the mirror. The free extremity of the shade 1 protrudes at a slot 26 in the casing. This slot comes next to the mirror, and is situated as close thereto as may be (see Fig. 5). The hook 3 limits the extent to which the shade can be wound upon the roller 2 by virtue of the tension of the spring 4. The hook does not pass through the slot, and the handle 4 is therefore in position to be grasped by the operator. The handle is grasped and directed across the face of the mirror until the hook 3 can be applied to the opposite short edge. The shade 1 is unwound and takes the position in Figure 1. The shade is made of light gauze and obstructs the glare.

While the construction and arrangement of the improved glare shield is that of a generally preferred form, obviously modifications and changes may be made without departing from the spirit of the invention or the scope of the claims.

I claim:—

1. In a device of the character described, a screen supporting arm extending from a point beyond the end of a rear view mirror rearwardly of said mirror, opposed clamping members between which said arm extends embracing the top and bottom edges of the mirror and means interconnecting said members and arm to support said arm from the mirror.

2. In a device of the character described, a glare shield supporting arm offset from and provided with an abutment flange to engage the end edge of a rear view mirror, said arm being extended from the flange longitudinally and in rear of the mirror, opposed clamps engaging the top and bottom edges of the mirror, and means interconnecting said arm and clamps effective to draw said clamps toward each other to clamp said mirror edges therebetween and support said arm from the mirror.

3. In a device of the character described, an arm for supporting a glare shield provided with an abutment to engage a mirror end, said arm being extended in rear of one end of the mirror terminated in an eye portion, and opposed mirror engaging clamps mounted on an edge portion of the mirror and having a connecting and clamping bolt extending therethrough.

WILLIAM E. HUMMEL.